United States Patent Office 3,172,813
Patented Mar. 9, 1965

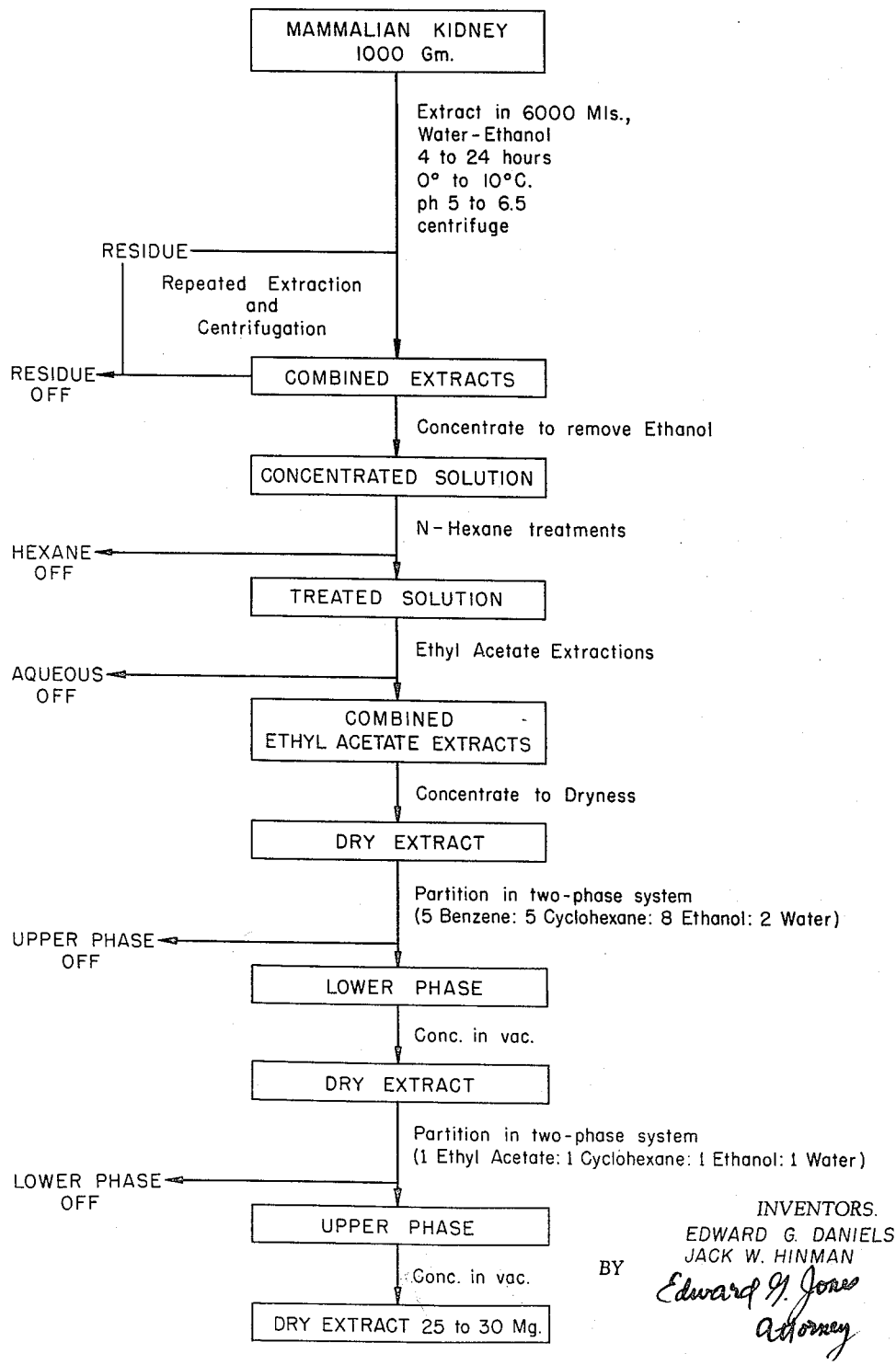

3,172,813
PROCESS FOR PREPARATION OF
KIDNEY EXTRACTS
Edward G. Daniels and Jack W. Hinman, Portage Township, Kalamazoo County, Mich., assignors to The Upjohn Company, Kalamazoo, Mich., a corporation of Delaware
Filed Feb. 13, 1963, Ser. No. 258,137
2 Claims. (Cl. 167—74.6)

This application is a continuation-in-part of application Serial No. 208,613, filed July 9, 1962, now abandoned.

This invention relates to an active extract prepared from animal sources and a process for its preparation, and more particularly to an active extract of kidney and a process of preparing said extract.

Animal raw material contains the metabolic products of the animal, for example, carbohydrates, fats, proteins, inorganic salts and other interfering substances. Animal raw material provides a good medium for growing contaminants; especially when the animal raw material is the kidney tissue of the animal, the kidney being an organ of secretion and excretion by which the blood frees itself of unneeded and toxic metabolic products.

Protein and protein-like substances have been found to interfere with the separation of said active extract and when present in incompletely purified extracts frequently cause undesirable side reactions. Growing contaminants lead to the presence of pyrogens and other materials of a toxic nature. In previous kidney extracts hypertensive substances have been encountered and heretofore available methods have not been completely successful in removing such undesirable hypertensive substances from the extracts.

Thus, the separation of an active extract from animal raw materials and especially kidney presents various problems and has been beset with many difficulties.

The present invention provides a nontoxic, water-soluble powdered extract of kidney which is substantially free of protein, free of hypertensive and pyrogenic contaminants, which is orally and parenterally active in reducing hypertension, which can be advantageously formulated into dosage unit forms such as parenteral solutions and oral dosage forms and which is a useful intermediate for the isolation and characterization of active substances. The invention also provides a process of preparing said extract.

The process comprises steps designed to separate the extract from the aforesaid contaminants and metabolic products and to supply said extract in nontoxic, water-soluble powdered form. The basic steps of the process comprise (1) solubilization of the extract in an inert aqueous solvent, (2) removal of undesirable organic components, (3) removal of inorganic salts and (4) drying of the extract.

The animal raw material is mammalian kidney, preferably canine, bovine, porcine, or ovine kidney, which is processed in the fresh or frozen condition. The anatomically separated medulla of the kidney or the whole kidney can be utilized.

In the case of the kidney medulla it is preferred to use an initial aqueous saline (sodium chloride) extraction at from about 0 to about 10° C. to dissolve the active extract. A concentration of saline of from about 0.5 to about 1.5% preferably 0.8 to 0.9% is used. After the aqueous saline extraction, the solubilization of the active extract in the inert aqueous solvent is brought about by adjusting the pH of the cold saline solution to from about 5 to about 6.5, preferably pH about 6, and adding sufficient inert solvent to precipitate an inactive insoluble fraction leaving the active extract in the soluble portion.

Alternatively, the solubilization of the active extract in the inert aqueous solvent can be brought about by directly extracting the fresh or frozen raw material with said inert aqueous solvent. The solubilization is carried out at a temperature of from about 0 to about 10° C. Acetone, ethanol, methanol, isopropanol, and propanol have been found to be operative as water-miscible inert solvents. A solvent concentration, v./v., of from about 40 to about 80% is operable, preferably from about 50 to about 60% and especially about 55%. The insoluble precipitated fraction or in the case of direct extraction of the kidney the insoluble tissue is discarded and the soluble active portion saved for further processing. For storage purposes prior to additional processing, the soluble portion is concentrated, preferably by freeze-drying. However, the alternative step of concentration in vacuo at a temperature of from about 20 to about 45° C. to reduce the concentration of the solvent to no more than about 10% v./v. can be used.

For additional processing an aqueous reconstituted solution of the freeze-dried material or the vacuum-concentrated inert aqueous solvent solution is subjected to a treatment designed to remove from the active extract contaminating organic components of higher molecular size. For the removal it is preferred to use a column packed with water-slurried resin such as a hydrophilic water-insoluble resin made by cross-linking the polysaccharide dextran. The type commercially known as Sephadex available from the firm Pharmacia, Uppsala, Sweden has been found to be especially satisfactory. The active solution in the aqueous reconstituted form or in the vacuum-concentrated inert aqueous solvent form is applied to the column and the column is eluted with purified water. It has been found that the eluates up to about 60% of the column volume contain undesirable organic components of higher molecular size. These eluates are discarded. The subsequent eluates, which have been found to be rich in active extract, can be employed directly in the next step of the process wherein inorganic salts are removed. Alternatively, these eluates can be dried to yield an active extract in powder form, e.g., by concentration in vacuo at a temperature of from about 20 to about 45° C., or preferably by freeze-drying. The dried extract so obtained is reconstituted with water to provide an aqueous solution for use in the next step of the process.

Next is the step of removing inorganic salts which in a measure are carried through the earlier processing steps, especially in the case of the preliminary aqueous saline extraction. This removal is brought about by applying an aqueous solution of the active extract to a column of a water-slurried ion retarding substance, for example, resins made by polymerizing an anionic monomer inside a basic anion exchange resin (or a cationic monomer inside a cation exchange resin). The preferred substance is obtainable from The Dow Chemical Company, Midland, Michigan, U.S.A., and is known as Retardion 11A8. It is made by polymerizing acrylic acid inside Dowex 1, a quaternary ammonium-type anion exchange resin containing benzyl and methyl groups. The column is then eluted with purified water. The eluates up to not more than 70%, preferably from about 40 to about 65% of the column volume, are rich in active extract.

The active aqueous eluate is dried to yield the active powdered extract. The drying is preferably brought about by freeze-drying. However, drying in vacuo at a temperature of from about 20 to about 45° C. can be used.

As above mentioned, the water-soluble powdered extract is nontoxic, free of pyrogenic contaminants, substantially free of protein and free of undesirable hypertensive substances. The extract possesses beneficial activity in reducing hypertension.

Alternative additional processing steps can be utilized for the removal of undesirable organic components and inorganic salts, and for the drying of the extract. These steps are applied to a soluble active portion obtained by extracting the mammalian kidney, preferably minced kidney medulla, with an inert aqueous solvent for at least 4 hours, preferably 4 to 24 hours, at a temperature of from about 0° to about 10° C. and at a pH of from about 5 to about 6.5. As above mentioned, the aqueous solvent contains from about 40 to about 80 percent of an organic solvent selected from acetone, ethanol, methanol, isopropanol, and propanol. The proportion of water, volume/volume, is from about 60 to about 20 percent. After the removal of the insoluble tissue, the soluble active portion is concentrated to remove substantially all of the organic solvent. A reduction in volume to from about ¼ to ¹⁄₂₀ of the original volume is brought about by concentrating the soluble active portion at a temperature no higher than about 40° C. preferably in vacuo.

The aqueous concentrate from the concentration in vacuo is treated with an inert, water-immiscible solvent selected from n-hexane and benzene, to remove contaminating fatty substances and to obtain a purified aqueous concentrate. An amount of the water-immiscible solvent equal to from one-half to two volumes of the volume of the aqueous concentrate is used, preferably an equal volume. The water-immiscible solvent phase is discarded, leaving the purified aqueous concentrate. Thereafter the purified aqueous concentrate is extracted with ethyl acetate to obtain an ethyl acetate solution of the active material. An amount of ethyl acetate equal to about one-half to about two volumes of the aqueous concentrate is used, preferably an equal volume. Thereafter the ethyl acetate is removed by concentration in vacuo at a temperature no higher than about 40° C. to obtain a dry extract which is active in reducing hypertension.

The activity can be assayed in the renoprival dog, which is bilaterally nephrectomized and kept on a special diet. During the assay period of four days, each dog is maintained on a daily diet affording 25 calories and containing 3 gms. of protein, per kilogram of body weight. A daily intake of 2.5 milliequivalents of sodium chloride per kilogram is given intravenously in about 16 mls. of aqueous solution per kilogram. Twice daily the arterial blood pressure is read and the two readings are averaged. The arterial pressures of the untreated dogs continue to rise during the four-day period.

For each kidney extract-treated dog, the dose per kilogram of body weight is 5 mls. of an aqueous solution containing an amount of the extract equivalent to 2 gms. of whole dog kidney or 0.5 gm. of kidney medulla. The arterial blood pressure of the treated dogs is considerably lower than that of the untreated dogs. Differences in pressure of from 30 to 60 mms. of mercury are observed in the treated dogs.

Assays using the test animal known as the renal hypertensive (Goldblatt) dog have demonstrated the hypotensive activity of the extract.

The following examples are illustrative of the processes and products of this invention and are not to be construed as limiting.

*Example 1*

The medulla portion of fresh dog kidneys was carefully dissected away from the cortex and homogenized for about 2 minutes with aqueous 0.8% sodium chloride solution at about 10° C., using 10 mls. of the solution per gram of medulla tissue. The cold homogenate was then centrifuged for about 1 hr. at about 0° C. The supernatant solution was saved for further processing.

1240 mls. of the centrifuged aqueous supernatant solution was adjusted to pH about 5.9 with dilute hydrochloric acid. 1705 mls. of 95% ethanol-5% water was added at about 3° C. over a period of 2½ hours, with constant stirring. Thereafter, the whole was centrifuged for 1 hr. at about 0° C. The opalescent supernatant solution was concentrated to approximately ½ volume on a vacuum rotary evaporator at a bath temperature of about 35° C. The concentrated solution was filtered through a filter aid (Celite 545, a diatomaceous earth filter aid) to remove insolubles and the soluble portion was freeze-dried, yielding 12.8 gms. of tan colored solid extract. This extract is hereinafter referred to as the ethanol precipitated extract.

4.3 gms. of the ethanol precipitated extract was dissolved in 40 mls. of deionized water and applied to a column of water-slurried Sephadex G25 measuring 6 cms. in diameter and 35 cms. in length and containing 225 gms. of Sephadex. 1100 mls. of deionized water was applied to the column as eluting solvent. The eluate up to 660 mls. was discarded. The next 360 mls. of eluate was pooled and freeze-dried, yielding 3.71 gms. of white dried extract. This white dried extract is hereinafter referred to as the Sephadex extract.

1 gm. of Sephadex extract was dissolved in 8 mls. of deionized water. The aqueous solution was applied to a column of water-slurried Retardion 11A8 measuring 2 cms. in diameter and 32 cms. in length. Elution was carried out with deionized water at a rate of 40 mls. per hour. 3.8-ml. fractions were collected and assayed for dry weight content. The eluate up to 38 mls. was discarded. The eluate between 38 and 76 mls. was freeze-dried, yielding 199 mgs. of a white water-soluble powdered extract. The extract possesses beneficial activity in ameliorating hypertensive afflictions.

*Example 2*

Frozen bovine whole kidney is finely ground and stirred for about 2 hrs. with 60% ethanol-40% water at about 2° C., using 5 mls. of the solution per gm. of kidney. The cold homogenate is allowed to stand at 4° C. for about 16 hrs. to settle debris. The clear supernatant solution is concentrated in vacuo at a temperature of about 20° C. to remove substantially all of the ethanol. The resulting aqueous solution is treated successively with Sephadex G25 and Retardion 11A8 and then freeze dried, as in Example 1. There is thus obtained a water-soluble powdered extract having hypotensive activity.

*Example 3*

1000 gms. of minced porcine kidney medulla is well mixed in 600 mls. of ethyl alcohol USP. The mixture is made up to 6 liters of 55 percent ethanol-45 percent water by the addition of 4600 mls. of 60% ethanol-40% water. The pH is adjusted to 6.0 with dilute HCl. The temperature is kept at 0° to 4° C., and the whole is stirred for approximately 16 hours. The supernatant is separated by centrifugation, and the residue is re-extracted as before with 6 liters of 55 percent ethanol-45 percent water. The supernatant is separated by centrifugation, the residue discarded, and the supernatants are combined.

The combined supernatants are concentrated in vacuo at a temperature of 30°–38° C. to approximately 800 mls. to provide an aqueous concentrate.

The aqueous concentrate is treated three times, each with an equal volume of n-hexane. The hexane solutions are discarded.

The treated aqueous concentrate is extracted four times, each with an equal volume of ethyl acetate. The aqueous solutions are discarded.

The ethyl acetate solution is evaporated to dryness in vacuo at a temperature of about 30° C. to obtain about 280 mgs. of a yellowish dry extract. The extract is active parenterally and orally in reducing hypertension.

To yield a more potent product the dry extract recovered from the combined ethyl acetate solutions is subjected to further processing by partitionings in each of two-phase countercurrent distribution systems containing (1) a mixture of benzene, cyclohexane, ethanol and water;

and (2) a mixture of ethyl acetate, cyclohexane, ethanol and water. The various partitions are concentrated to dryness in vacuo and selection of the more potent product therefrom is made on the basis of biological determinations of hypotensive activity in the aforesaid renoprival dogs and in vagotomized, pentobarbitalized, pentolinium treated dogs. From 25 to 30 mgs. of the more potent dry extract are obtained from each kilogram of renal medulla.

To yield an even more potent product the so-obtained dry extract is subjected to additional processing by chromatography of its aqueous butanol solution on a Sephadex G25 column and concentrating effluent fractions to dryness in vacuo. The more potent dry extract therefrom is dissolved in dry ethyl acetate, and the solution is chromatographed on silica. The effluent fractions are concentrated to dryness in vacuo. Selection of the more potent product from the various effluent fractions of each column is made on the basis of biological determinations of hypotensive activity. A final dry extract is obtained which is active in the aforesaid renoprival dogs at a dosage of 3.3 micrograms per kilo per day and comparably active in vagotomized, pentobarbitalized, pentolinium treated dogs. From 0.1 to 0.2 mg. of the final dry extract is obtained from each kilogram of renal medulla.

*Example 4*

168 gms. of dry extract from combined ethyl acetate solutions was partitioned in an 8-tube system of benzene, cyclohexane, ethanol, and water (5:5:8:2). Each tube contained approximately 700 mls. of upper and 700 mls. of lower phase. From tubes 1–3 inclusive, 59 gms. of dry extract was obtained.

The so-obtained dry extract was further partitioned in an 8-tube system of ethyl acetate, cyclohexane, ethanol, and water (1:1:1:1). Each tube contained approximately 500 mls. of upper and 500 mls. of lower phase. From tubes 4–8 inclusive, 15 gms. of dry extract was obtained.

2 gms. of the so-obtained dry extract was dissolved in 10 mls. of water-saturated butanol, and the solution was chromatographed over a Sephadex G25 column. The column was eluted with an additional 800 mls. of water-saturated butanol. 53 mgs. of potent dry extract was obtained from the later effluent fractions.

The so-obtained dry extract was dissolved in 2 mls. of dry ethyl acetate and chromatographed over a silica column. The column was eluted with an additional 150 mls. of dry ethyl acetate. 7.5 mgs. of final dry extract was obtained from the early effluent fractions. This final dry extract, administered in aqueous solution, demonstrates hypotensive activity in renoprival dogs at a dosage of 3.3 micrograms per kilo per day.

What is claimed is:
1. A process which comprises:
   (1) extracting mammalian kidney for at least four hours at a temperature of from about 0° to about 10° C. and at a pH of from about 5 to about 6.5 in an inert solvent containing, v./v., from about 60 to about 20 percent of water and from about 40 to about 80 percent, v./v., of a solvent selected from the group consisting of acetone, methanol, ethanol, propanol, and isopropanol to obtain an aqueous solvent solution,
   (2) concentrating the aqueous solvent solution at a temperature no higher than about 40° C. to from about one-fourth to about one-twentieth of its original volume, to obtain an aqueous concentrate,
   (3) treating the aqueous concentrate with from about one-half to about two volumes of an inert water-immiscible solvent selected from the group consisting of n-hexane and benzene to obtain a purified aqueous concentrate,
   (4) extracting the purified aqueous concentrate with from about one-half to about two volumes of ethyl acetate to obtain an ethyl acetate solution, and
   (5) concentrating the ethyl acetate solution to obtain a dry solid extract.
2. The process of claim 1 which includes partitioning the dry solid extract in two-phase distribution systems containing (1) a mixture of benzene, cyclohexane, ethanol, and water (5:5:8:2); and (2) a mixture of ethyl acetate, cyclohexane, ethanol and water (1:1:1:1); and concentrating the various partitions to dryness in vacuo.

References Cited by the Examiner

UNITED STATES PATENTS 2,769,749　11/56　Thompson et al. _____ 167—74.6

OTHER REFERENCES

Page et al.: Annals of Internal Medicine, vol. 18, No. 1, pp. 29–42, January 1943.

Journal of the American Medical Association, vol. 121, No. 12, p. 977, March 20, 1943.

Jonnard et al.: Journal of the American Pharmaceutical Association, Scientific Edition, October 1943, pp. 260–278.

JULIAN S. LEVITT, *Primary Examiner.*

FRANK CACCIAPAGLIA, JR., LEWIS GOTT,
*Examiners.*